United States Patent [19]

Kmonk et al.

[11] 4,269,661
[45] May 26, 1981

[54] TOP NOZZLE FOR A NUCLEAR REACTOR FUEL ASSEMBLY

[75] Inventors: Stanley Kmonk; Dennis J. Cadwell, both of Plum Borough; Stephen J. Ferlan, Wilkins Township, Allegheny County, all of Pa.

[73] Assignee: Westinghouse Electric Corp., Pittsburgh, Pa.

[21] Appl. No.: 915,650

[22] Filed: Jun. 15, 1978

[51] Int. Cl.² .................... G21C 1/06; G21C 3/32
[52] U.S. Cl. .................... 176/50; 267/178; 267/169; 176/78
[58] Field of Search .............. 176/65, 50, 76, 78, 176/35, 36; 267/169, 178

[56] References Cited

U.S. PATENT DOCUMENTS

| | | | |
|---|---|---|---|
| 2,206,315 | 7/1940 | Zimmerman | 267/169 |
| 2,879,216 | 3/1959 | Hurwitz, Jr. et al. | 176/78 |
| 2,952,600 | 9/1960 | Newson | 176/35 |
| 2,982,713 | 5/1961 | Sankovich et al. | 176/78 |
| 3,235,463 | 2/1966 | Sankovich | 176/78 |
| 3,382,153 | 5/1968 | Bigge et al. | 176/78 |
| 3,572,621 | 3/1971 | Whitten et al. | 267/178 |
| 3,769,158 | 10/1973 | Winders | 176/78 |
| 3,770,583 | 11/1973 | Klumb et al. | 176/78 |
| 3,791,466 | 2/1974 | Patterson et al. | 176/78 |
| 3,854,308 | 12/1974 | Czech et al. | 267/178 |

FOREIGN PATENT DOCUMENTS 1439426 3/1969 Fed. Rep. of Germany ............. 176/76

Primary Examiner—Harvey E. Behrend
Attorney, Agent, or Firm—J. R. Campbell; Z. L. Dermer

[57] ABSTRACT

A top nozzle for a nuclear reactor fuel assembly which includes an orifice plate designed to receive control rod guide tubes extending upwardly from the top of the fuel assembly. Nozzle pin extensions connected to the orifice plate are axially coextensive with the guide tubes and project upwardly through a top nozzle hold-down plate, and through openings in the upper core plate in the reactor. The hold-down plate is spring biased into an upper core plate engaging position and since the pin extensions are adapted to move in the core plate and against the action of the springs, the top nozzle thus becomes effective in accommodating upwardly acting hydraulic forces which tend to lift the fuel assembly, and to accommodate differential expansion of parts in the fuel assembly as compared to the core barrel in which the assembly is located. The number of pins disposed in the hold-down plate move in slots formed in each of the guide tube extensions and the uppermost position of the fuel assembly is determined when the pin is in the bottom of its slot in each of the guide tubes.

1 Claim, 7 Drawing Figures

TOP NOZZLE FOR A NUCLEAR REACTOR FUEL ASSEMBLY

BACKGROUND OF THE INVENTION

The invention described herein relates to nuclear reactor fuel assemblies and particularly to an improved design of top nozzle used for protecting the fuel assembly against damage caused by hydraulic lift forces and differential thermal expansion of fuel assembly parts.

Conventional designs of fuel assemblies used in commercial reactors include multiple fuel rods and control rod guide tubes held in spaced relationship with each other by grids located along the fuel assembly length. This assembly of fuel rods and guide tubes is attached to a lower nozzle which rests on a bottom core plate in the reactor. The upper end of each assembly is attached to a top nozzle which is spring biased into engagement with the bottom surface of an upper core plate. Since coolant flows at high velocity against the lower end of the assembly and then upwardly therethrough, the hydraulic forces are occasionally sufficiently great to lift the assembly and the resulting hydraulic load then must be absorbed in the reactor. Also, since the fuel assembly is more than 13 feet in length, the differential thermal expansion between the assembly components and reactor core barrel in which they are located, must be accommodated in the assembly.

In prior designs, springs were used in the top nozzle for accepting the loads, as they are in the present invention, but the design was such that the springs were allowed to compress fully, or solidly, and the loads resulting from thermal expansion or hydraulic lift, then were transmitted through the top nozzle to the upper core plate. However, since the upper core plate is heavy and stationary and the spring height may vary slightly when fully compressed, the loads could distribute in a non-uniform manner among the relatively thin walls of the control rod guide tubes in the assembly. Since the distribution of the hydraulic loads could exceed the combined strength of a guide tube in a particular assembly, the guide tube could fail in compression and consequently result in great damage to the fuel rods and/or control rod guide tubes in the reactor.

SUMMARY OF THE INVENTION

Briefly stated, the above disadvantages in the prior art are overcome in this invention by providing a design of top nozzle which includes nozzle tube extensions connected to the upper ends of control rod guide tubes. Springs circumferentially disposed on the extensions are held between a lower orifice plate and upper hold-down plate which interfaces with the upper core plate in the reactor. The hold-down plate is free to move vertically on the nozzle tube extensions and against the action of the springs. To accommodate forces tending to lift the fuel assembly during reactor operation, upward movement of the assembly transfers such lifting forces to the springs on the tube extensions which act as an intermediate member for further transferring such forces to the hold-down plate, upper core plate and associated reactor structures. The top nozzle structure is designed to permit only partial compression of the springs and uniform loading of the guide tubes thus eliminating the possibility of fuel assembly structure absorbing the hydraulic lifting load forces with consequent failure of the fuel assembly parts.

BRIEF DESCRIPTION OF THE DRAWINGS

While the specification concludes with claims particularly pointing out and distinctly claiming the subject matter of the invention, it is believed the invention will be better understood from the following description taken in connection with the accompanying drawings wherein:

Figure 2:
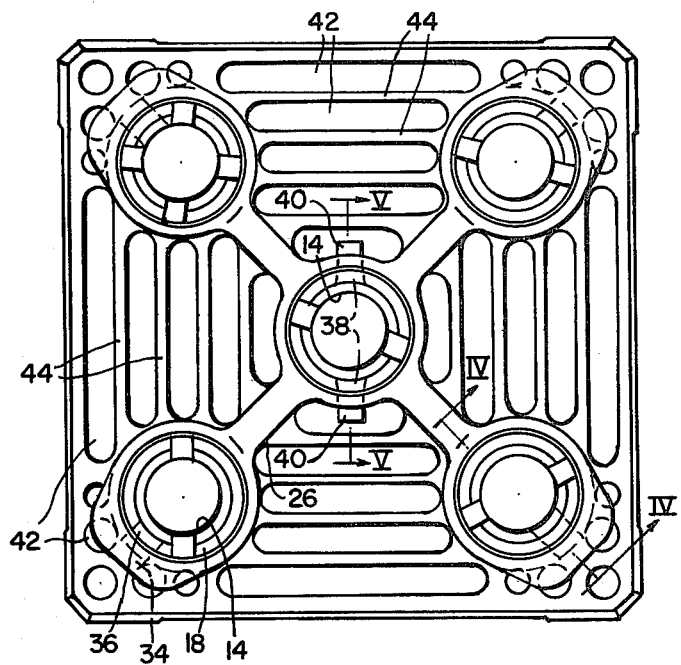
FIG. 2 is a plan view of the fuel assembly shown in FIG. 1.
Figure 1:
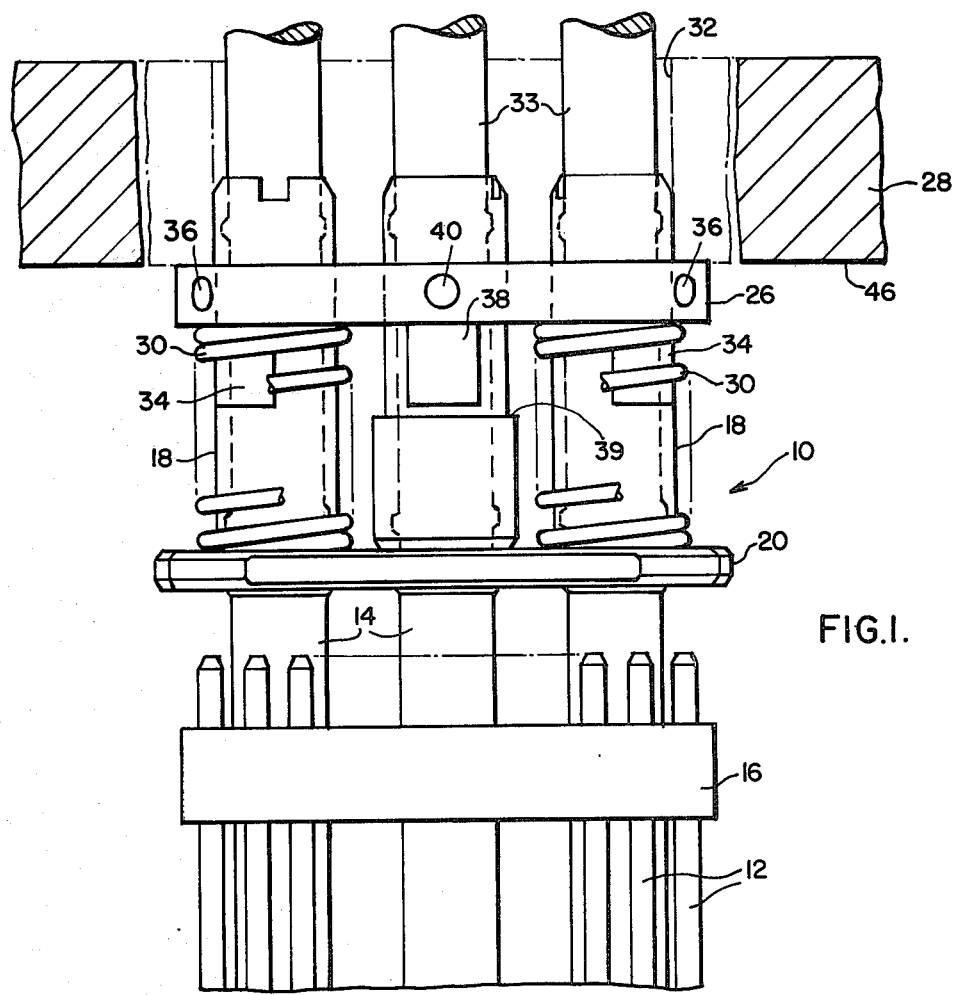
FIG. 1 is a view in elevation, partly in section, of the upper portion of a fuel assembly including the top nozzle of this invention.

Referring now to the drawings wherein like reference characters designate like or corresponding parts throughout the several views, there is shown in FIGS. 1 and 2 the upper portion of a fuel assembly 10 including multiple fuel rods 12 and control guide tubes 14 held in spaced relationship with each other by multiple grids 16 disposed along the fuel assembly length. The fuel assembly is supported on a bottom nozzle and lower core plate, not shown, in accordance with conventional practices.

Figure 3:
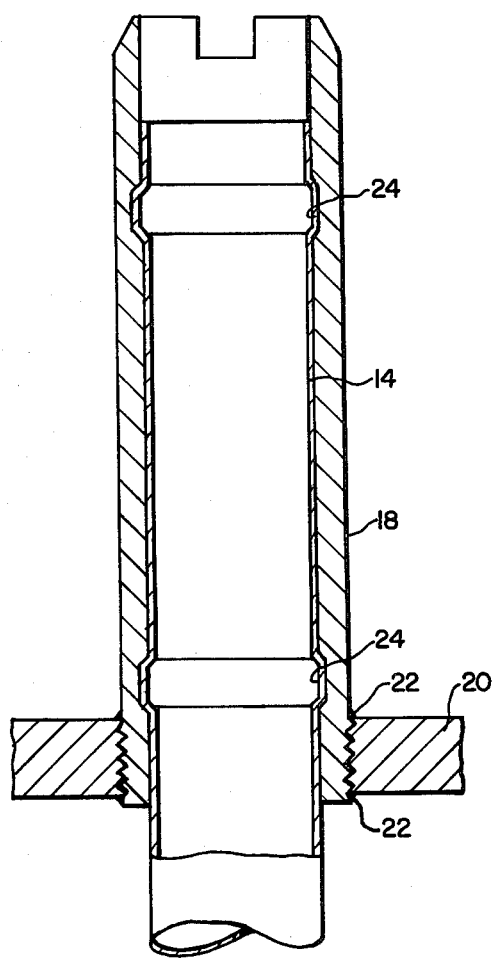
FIG. 3 is a view in elevation, partly in section, illustrating the arrangement used for securing a control rod guide tube into a tube extension located in the top nozzle.

As shown in FIG. 3, the top nozzle includes a number of guide tube extensions 18, one for each control rod guide tube, each of which is threaded at its bottom end into orifice plate 20 and secured firmly in place by welds 22. In order to firmly anchor the control rod guide tubes 14 to the top nozzle, FIG. 3, the guide tube extension is provided with a pair of spaced grooves 24 and the control rod guide tube 14 inserted thereinto is squeezed into the openings or grooves 24 which deforms the metal and thus provides an inseparable fit between the parts.

The upper end of the guide tube extensions 18 extend through corresponding openings formed in a hold-down plate 26, FIGS. 1 and 2, which also include flow channels 42 through which coolant flows after cooling the fuel assembly. The ends of the guide tube extensions also project upwardly into upper core plate 28. Helical springs 30 are concentrically disposed on the guide tube extensions and bear at their lower ends against the orifice plate 20 and at their upper ends against the hold-down plate 26, thus urging the hold-down plate into contact with the lower surface of upper core plate 28. It will be noted that the upper core plate 28 includes a substantially large opening 32 into which the guide tube extensions extend. It further will be understood that control rods 33 are adapted for vertical movement in the control rod guide tubes 14 during the course of controlling reactor operation.

Figure 4:
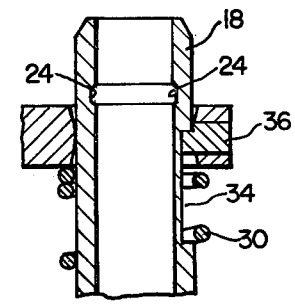
FIG. 4 is a sectional view in elevation taken on lines 4—4 of FIG. 2.
Figure 5:
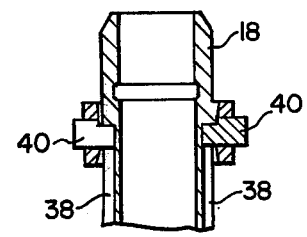
FIG. 5 is a view taken on lines 5—5 of FIG. 2.
Figure 7:
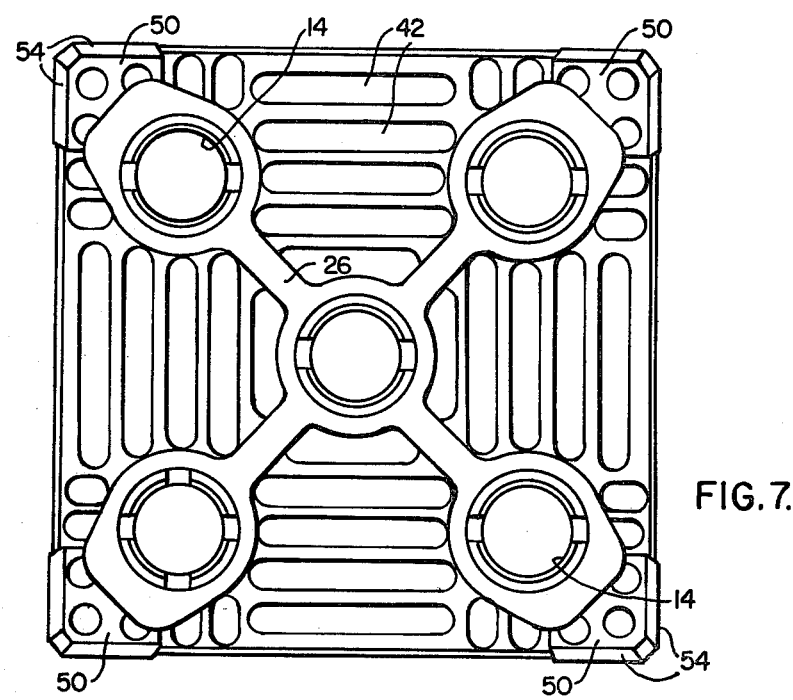
FIG. 7 is a plan view of the nozzle illustrated in FIG. 6.

In order to limit the upward movement of the fuel assembly 10, each of the guide tube extensions is equipped with an axially extending slot 34, FIG. 4, in which a pin 36 is adapted to ride when the fuel assembly is moved upwardly. The plan view of the assembly shown in FIG. 2 more clearly shows the design of the hold-down plate 26 and how the pins 36 are adapted to ride in the slots 34 located in each of the four corner guide tube extensions 18. As more clearly shown in FIGS. 2 and 5, the central control rod guide tube extension 18 located in the center of the four corner guide tubes carries a pair of oppositely disposed slots 38 and corresponding pins 40 in the hold-down plate 26. The large number of openings 42 formed by ligaments 44 are utilized to facilitate the flow of coolant through the fuel assembly. In practice, the axis of fuel rods will lie immediately below the ligaments in order to eliminate the possibility of a fuel rod being ejected from the fuel assembly in the event it encounters unusually heavy coolant flows or other forces which may move a fuel rod upwardly relative to the fuel assembly components.

In operation, after all the fuel assemblies have been set in position in the reactor, the upper core plate 28 is lowered into position such that its lower surface 46 engages the upper surface of hold-down plate 26. In so doing, the springs are compressed to a slight degree thereby applying a downward force on the orifice plate 20 and control rod guide tubes 14. The guide tubes 14 transmit this load through the lower nozzle to the base of the reactor. The design of the springs and the distance between the orifice plate and hold-down plates are chosen such that the springs will never be fully compressed during reactor operation. In the event a heavy hydraulic lifting force is applied to the fuel assembly, the complete fuel assembly will move upwardly thus compressing springs 30 and causing the pins 36 and 40 respectively to ride in their slots 34 and 38 formed on the guide tube extensions. The springs therefore will absorb the lifting forces and transmit the same through the hold-down plate 26 and into the upper core plate 28 for further distribution through the internal structure of the reactor. As the assembly moves upwardly and thus compresses the springs, the guide tube extension slots will ride on the pins until, for each outer guide tube extension, the bottom of the slot is contacted by the pin, and for the center guide tube extension the bottom surface of the hold-down plate is contacted by the upper surface of the center guide tube extension shoulder 39. Since this will uniformly occur in all of the guide tube extensions, uniform loading of the guide tubes will occur but only after the springs have been compressed to the desired degree. As indicated previously, the springs have a constant such that they never are compressed to the point where all coils in each spring contact one another since this then would involve a solid structure which is intended to be avoided.

Figure 6:
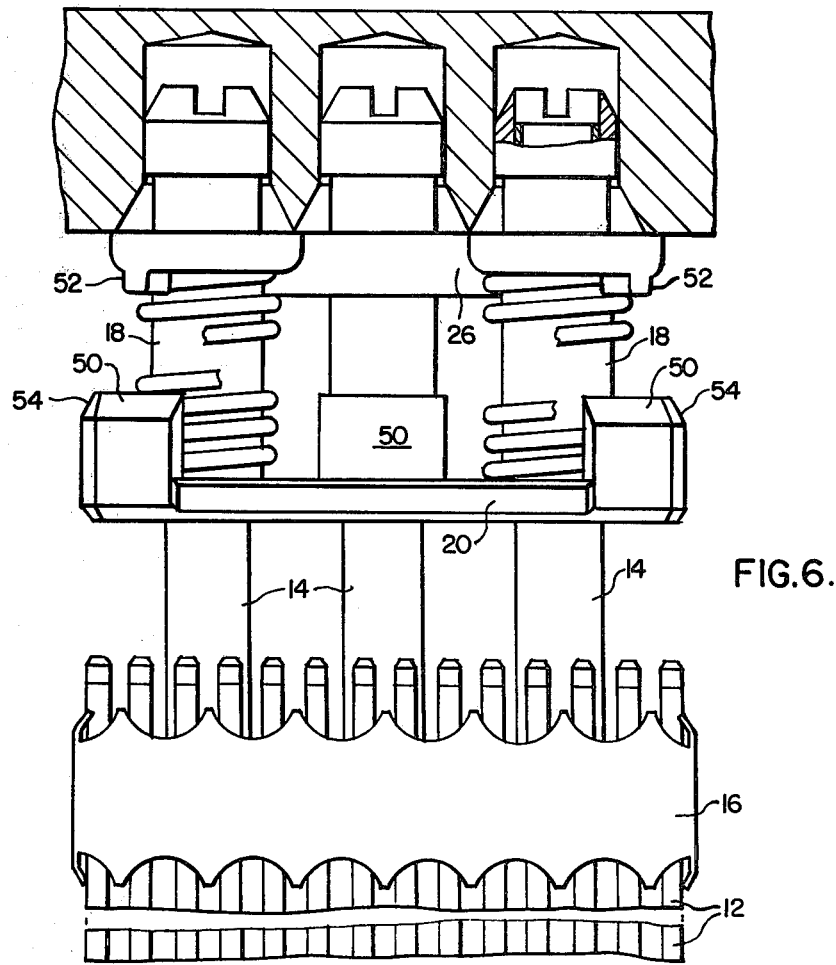
FIG. 6 is a modification of the top nozzle design disclosed herein.

The modification of FIG. 6 illustrates an arrangement where pads 50 are used at each of the four corners of the assembly, and at the center, where each control rod guide tube extension 18 projects upwardly through the hold-down plate 26. Each of these pads on the orifice plate 20 project upwardly a slight distance while the bottom surface of the hold-down plate likewise has four downwardly projecting pads 52 arranged to contact the lower pads when the fuel assembly is lifted. These nozzle pads limit the amount of fuel assembly lift in the event of an accident, such as a blow down and the four corner pads provide lead in chamfers 54 for fuel handling. The nozzle pads are sized such that they contact the hold-down plate prior to the springs being compressed solid and thereby present the nozzle guide tube extensions from topping out in the blind holes in the upper core plate. This arrangement helps assure uniform loading of the guide tubes during any accident which causes fuel assembly lift.

It will be apparent that many modifications and variations are possible in light of the above teachings. It therefore is to be understood that within the scope of the appended claims the invention may be practiced other than as specifically described.

We claim:

1. In a nuclear reactor fuel assembly including an array of fuel rods and control rod guide tubes held in spaced relationship with each other by means positioned at intervals along their length, upper and lower nozzles connected to opposite ends of said guide tubes, and an upper core plate above the fuel assembly which absorbs lifting forces acting on the assembly, the upper nozzle including:

control rod guide tube extensions including a center guide tube extension and selected guide tube extensions, said extensions being attached to an orifice plate located immediately above said fuel rods;

means respectively connecting the control rod guide tubes to said tube extensions;

a hold-down plate vertically movable on said tube extensions, said plate having openings of a size sufficient to accept the guide tube extensions;

springs on said selected tube extensions between the orifice and hold-down plate and biased in a direction to urge the hold-down plate vertically against said upper core plate;

at least one vertically extending slot in each guide tube extension outer surface; and a pin for each of said slots, each of said pins being mounted in the hold-down plate and in a position to have its end project into a corresponding slot formed in the tube extension, the arrangement being such that as upwardly acting forces lift the fuel assembly, the springs on said extensions are unformly compressed until the pins are engaged by the bottom of said slots, thus permitting the assembly to be lifted to its upper limit without compressing the springs to a solid condition; and a shoulder on said center tube extension arranged to contact the hold-down plate when said forces lift the fuel assembly to thereby supplement the action of the pin and slot arrangement in limiting upward movement of the fuel assembly.

* * * * *